July 11, 1944.   E. H. WHITTAKER   2,353,207
FLASK CHARGING AND MOLDING MACHINE
Original Filed July 9, 1941   2 Sheets-Sheet 1
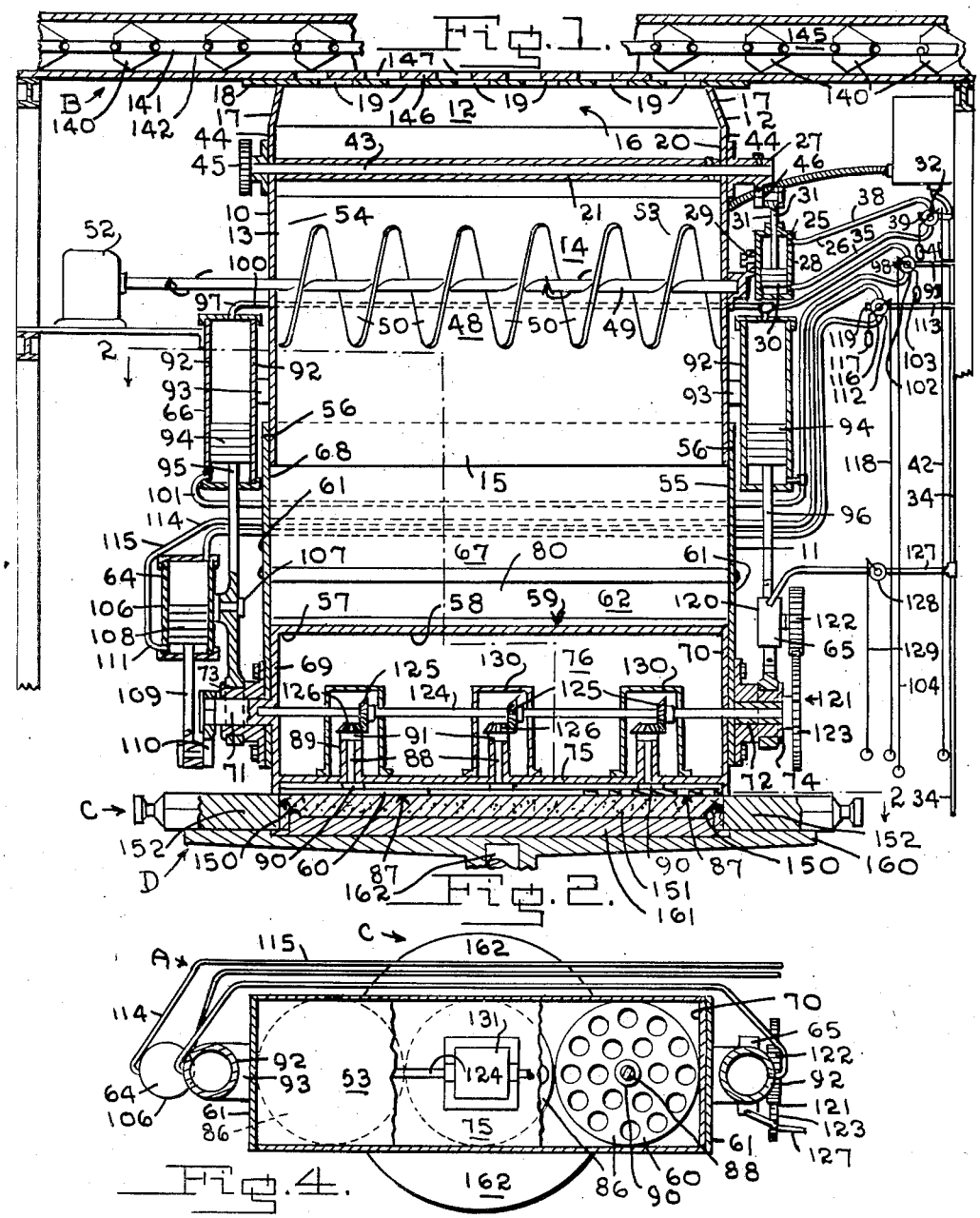
INVENTOR.
Edward H. Whittaker
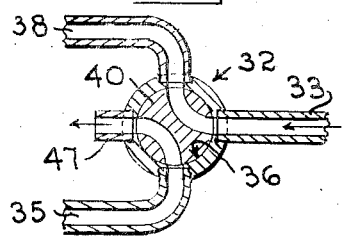
ATTORNEYS.

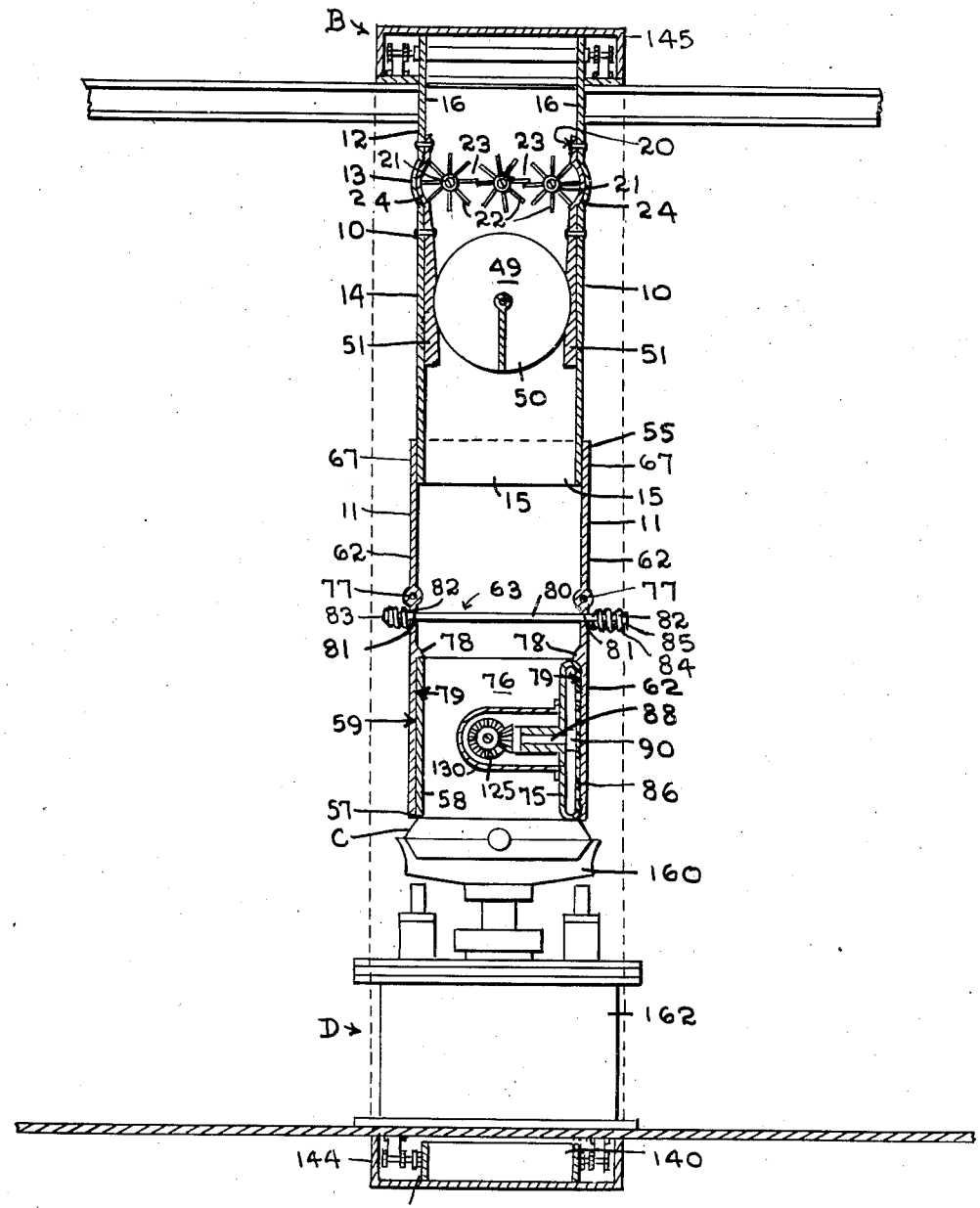
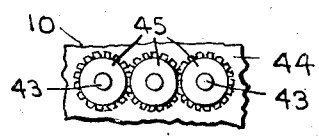

Patented July 11, 1944

2,353,207

UNITED STATES PATENT OFFICE 2,353,207

FLASK CHARGING AND MOLDING MACHINE

Edward H. Whittaker, Jersey City, N. J.

Original application July 9, 1941, Serial No. 401,651. Divided and this application April 16, 1943, Serial No. 483,294

12 Claims. (Cl. 22—35)

This invention relates to foundry plants and more particularly to a flask charging and molding machine, and this application is a division of an application for United States patent on Foundry plants, filed by me on July 9, 1941, Serial Number 401,651.

An important object of the invention is to provide a machine or unit for measuring and evenly distributing a quantity or volume of molding sand, and for tamping and leveling the sand in the flask and about the pattern.

Another important object is to provide a dual-purpose machine, one unit of which serves like a sand frame in one position, as a tamping head in another position and as a leveler for the mold, when in a third position, and to provide means whereby this unit may be quickly and conveniently changed from one position to another, and raised and lowered for tamping, for moving it into operative relation to the flask and mold, and for lifting it clear of the completed product to facilitate removal thereof from the machine.

Other objects and advantages of the invention will appear in the following detailed description, taken in connection with the accompanying drawings, forming a part of this specification, and in which drawings:

Figure 1 is a vertical longitudinal section of the novel machine, showing, in section, a portion of an endless conveyor and a pattern stripper, associated therewith.

Figure 2 is a horizontal section substantially on the line 2—2 of Figure 1.

Figure 3 is a vertical transverse section of the novel machine, with the endless conveyor of Figure 1, also in section, and the stripper of Figure 1 in elevation.

Figure 4 is a sectional detail of a rotary valve preferably employed in controlling the passage of air or fluid pressure to and from pneumatic cylinders used in the operation of the flask charging and molding machine.

Figure 5 is a fragmentary detail view in elevation showing a preferred arrangement of gears for operating sand measuring rotors in the flask charging and molding machine.

In the drawings, wherein for the purpose of illustration is shown a preferred embodiment of the invention and wherein similar reference characters designate corresponding parts throughout the several views, the letter A designates the new flask charging and molding machine; the letter B an endless conveyor for molding sand, associated therewith, C a flask and D a stripper associated with the novel flask charging and molding machine.

The flask charging and molding machine A comprises a combined hopper, measurer and distributor section 10, and a subjacent combined sand-receiving, tamping and leveling section 11, providing a housing.

As for the distributor section 10, it comprises a hopper portion 12, a measuring portion 13, a distributor portion 14 and a spout portion 15.

The hopper portion 12 comprises side walls 16 and end walls 17, and communicates with the bottom of the housing of the sand conveyor B, thru openings therein, to be subsequently described. I prefer to provide, at the upper end of the hopper portion 12, an adjustable horizontally-disposed baffle 18, having spaced-apart openings 19 which may register with, or partly close, the openings in the sand conveyor housing. This is for the purpose of regulating the volume or amount of sand entering the hopper portion 12. This is important since the sand conveyor B preferably supplies more than one machine A and, if the flow of sand descending into hopper portion 12 of the machine, first served by conveyor B, is not restricted, it may become very compact in the hopper portion 12 and rob, so to speak, the machines A, subsequently supplied by the conveyor B.

The baffle 18 may be adjusted to entirely shut off the supply of sand to any machine A, or to provide varying restricted passage of sand to the hopper portion 12 of any machine A.

Beneath the hopper portion 12 is the measuring portion 13, comprising a throat 20, open to the hopper portion 12, a plurality of horizontally-disposed longitudinally winged sleeves 21 in the throat 20; the wings 22 of which overlap slightly as shown in Figure 3 to provide cavities 23 around the sleeves 21, in which measured quantities of sand may drop by gravity from the hopper portion 12, a wear-resisting arcuate barrier 24, in the throat 20, running longitudinally of the outermost winged sleeves 21, and against which the wings 22 thereof may rub or have closely-spaced relation, an engine 25, means 26 for supplying motive power to the engine 25, and motion transmitting means 27 for imparting rotation of the engine 25 to the sleeves 21.

The engine 25, in the example shown, comprises an oscillating cylinder 28, pivoted as at 29, a piston 30, and piston rod 31.

As for the means 26 for supplying motive power to the engine 25, this may comprise a dual-way valve 32, of conventional construction, shown in Figure 4, having a pipe 33, connected to a supply pipe line 34, a flexible pipe 35, connecting the cavity 36 of the valve body 37 with the lower portion of the oscillating cylinder 28, and a flexible pipe 38, connecting the cavity 36 with the upper portion of the cylinder 28, and a lever 39, on the valve stem proper 40, provided with a weight 41 on one end of the lever 39, and a depending operating rod or member 42 on the other end of this lever. The rod 22 extends downwardly a sufficient distance to be conveniently reached and operated by a workman at the base of the machine A.

The motion transmitting means 27, for imparting motion of the engine 25 to the sleeves 21, comprises a shaft 43 secured to each sleeve 21 and extending thru the end walls 44 of the throat 20, a train of gears 45, shown in Figure 5, on the ends of shafts 43 at one end of the machine A, and a crank 46, secured to the opposite end of one of the shafts 43 and to the piston rod 31.

A workman, by pulling on the depending operating rod 42, may cause an upstroke of the piston 30, and impart a half turn to the winged sleeves 21, and thus permit a measured volume of sand to fall from the hopper portion 12. Upon releasing the pull on rod 42, the weight 41 will descend and operate valve 32, to cause a downstroke of piston 30 and impart another half turn to the winged sleeves 21, for the purpose set forth.

Fluid under pressure in cylinder 28 may find exit thru port 47, shown in Figure 4, in the usual way.

Beneath the measuring portion 13 is the distributing portion 14, comprising a chamber 48, a spirally-winged shaft 49, the wings 50 of which extend from end to end of chamber 48 and, preferably, between wear resistant impact plates 51, which may be formed integral with the barriers 24, as in Figure 3 and a rotor 52, for rotating the shaft 49, at a high rate of speed. The chamber 48 is open to the lower portion of throat 20, and at its lower end communicates with the spout portion 15 which, in the example shown, is rectangular in horizontal section.

The wings 50 of shaft 49 rotating in the direction of the arrow in Figure 1, not only cause a turbulence in the chamber 48 but also tend to throw some of the sand or dust therefrom, from end 53 toward end 54 of chamber 48, thereby distributing a greater volume of sand likely to descend from the measuring portion 13 at end 53, since the corresponding subjacent end of hopper portion 12 is the first to receive sand from conveyor B, and the sand is apt to be more compact at that end of the hopper portion than at the other end thereof.

With reference to the novel combined tamping and leveling section 11, it functions somewhat like a sand frame when in the position shown in Figure 3. It comprises a reciprocable sand-receiving portion or housing 55, including a sleeve 56 in telescopic relation with spout portion 15, a rotatable sand frame 57 providing a ramming or tamping head 58, having a compacting face 59, and carrying a leveling mechanism 60, so that either may be disposed in operative relation to the flask C and mold, spaced supporting plates 61, for the frame 57, carried by the sleeve 56, oppositely-disposed, pivoted guiding plates 62, means 63 for normally and yieldably retaining the guiding plates 62 in operative positions with respect to the rotatable frame 57, to confine the sand to a predetermined path, means 64 for rotating the frame 57, means 65 for operating the leveling mechanism, and means 66 for raising and lowering the reciprocable portion. The sand frame 57 is open at two opposite sides, opening into a sand way, later to be described, these openings being in right angular relationship with the tamping head 58.

It is preferred to telescope the sleeve 56 over the spout 15, so the descending sand will not find its way between the confronting faces of the two. In the example shown, the sleeve has side walls 67 and end walls 68, it being rectangular in horizontal section. The supporting plates 61 may be continuations of the end walls 68, as shown in Figure 1.

The sand frame 57 comprises square end plates 69 and 70, having trunnions 71 and 72 journaled in the plates 61, as by bearings 73 and 74, respectively; the wall-like head 58 extending from one edge of plate 69 to the corresponding edge of plate 70; and a wall 75 opposite head 58 and secured to end plates 69 and 70 to provide a sand way 76 in the frame, as shown in Figure 3. When the rotatable frame is in the position shown in Figure 3, the way 76 communicates with spout 15 of section 10 and sand may descend thru it, or pile up in way 76. If the frame 57 is given a quarter turn counterclockwise, then the compacting face 59 is lowermost, to compact or ram the sand in the mold. If the frame 57 is given a quarter turn clockwise from the position shown in Figure 3, then the leveling mechanism 60 will be lowermost for use in the mold.

The guiding plates 62 are pivoted at their upper ends to the lower margins of walls 68 of sleeve 56, as at 77, and are preferably provided with horizontal ribs 78 on their confronting faces 79 to engage longitudinal marginal portions of the sand frame when it is in any one of the three positions above mentioned, so as not to permit escape of sand. As the sand frame is rotated, these guiding plates swing first outwardly from a normal position, as the longitudinal edges of the frame rub against the faces 79, and then swing inwardly toward each other, resuming a normal position at each quarter turn of the frame. In order to firmly hold the plates 62 in intimate or sand-excluding relation to frame 57, the means 63 is provided. It may comprise a rod 80 extending thru openings 81 in plates 62 and coil springs 82 about the rod 80, one abutting a head 83 on one end of the rod and the adjacent plate 62, and the other spring 82 confined between a washer 84 and nut 85 on the other end of rod 80, and the adjacent plate 62.

As suitable leveling mechanism 60, I have shown, as leveling devices, three perforated discs 86 lying in the same plane with their working faces 87 in a plane substantially the same distance from the axis of trunnions 71 and 72, as the compacting face 59 is located from said axis, these discs being secured to shafts 88 journaled in sleeve-like bearings 89 which may be cast integral with wall 75, so that the wall 75 supports the sleeve-like bearings 89. The discs 86 may be held spaced from wall 75 by bosses 90 acting as hubs for shafts 43 and the shafts, opposite these bosses, may have collars 91 secured thereto for engagement with the bearings 89.

The means 66 for raising and lowering or rapidly reciprocating the section 11 may comprise stationary cylinders 92 carried by section 10, as by brackets 93, pistons 94 in the cylinders; connecting rods 95 and 96 between the pistons and bearings 73 and 74, respectively; and, means 97 for operating the pistons 94. This means 97 is similar to that described in connection with engine 25, including a four-way valve 98 having pipe 99 to supply pipe line 34, pipes 100 between the valve 98 and the uppermost portion of the chambers of cylinders 92, and pipes 101 between the valve and the lower portions of the chambers of said cylinders; and lever 102, weight 103, and rod 104 all operating in a manner previously described. It is deemed important that the weight 103 overbalance the weight of rod 104, for the purpose of introducing fluid under pressure into the lower portions of cylinders 92 whenever a workman releases hold on rod 104, this being for safety purposes.

The means 64 for rotating frame 57 may comprise an oscillating cylinder 106 pivoted as at 107 to piston rod 95; piston 108 therein; connecting rod 109 secured to the piston and having connection with a crank 110 on trunnion 71; and means 111 for operating piston 108.

This means 111 may be similar to that described for operating engine 25, comprising as it does, four-way valve 112; pipe 113 connected to supply pipe 34; pipe 114 having a flexible section, between valve 112 and the upper portion of the cavity of cylinder 106; similar pipe 115 between the valve 112 and the lower portion of the cavity of cylinder 106; and, lever 116, weight 117 and rod 118, all operating as previously described, the exhaust port of valve 112 being shown at 119.

In the example shown, the leveling discs 86 are rotated by a turbine 120 mounted on connecting rod 96, thru motion transmitting means 121 comprising a gear 122 on the turbine shaft; a gear 123 meshing therewith, on a line shaft 124 extending thru the center of the sand frame and supported by trunnions 71 and 72; and, co-meshing bevel gears 125 and 126 on the shafts 88 and 124, respectively. Motive fluid may be delivered to turbine 120 by valve controlled pipe 127 having connection with supply pipe line 34, the valve being shown at 128 and having an operating lever and rod 129 similar to that previously described.

In order to exclude sand from the bevel gears 125 and 126, they may be disposed in housings 130 secured to the wall 75, the shaft 124 extending thru the housings which also envelop the bearings 89.

The endless conveyor B, for sand, in the example shown, includes buckets 140, carried by chains 141, there being an upper run 142 and a lower run 143, in addition to the ascending and descending runs (not shown) and lower and upper housings 144 and 145 respectively. The upper housing 145 has a grill 146, providing openings 147 disposed over the machine A which may register with the openings 19 in the baffle 18.

A flask C is shown, by way of illustration, in place under the machine A. The flask contains a cavity 150 for the mold 151 with the inner faces of the end walls 152 of the flask registering with the end plates 69 and 70.

The flask C may be supported by a stripper D including a bed plate 160 for the flask C and for a pattern 161, and a means 162 for vertically reciprocating the bed plate 160.

From the foregoing description, it will be seen that a measured volume of molding sand will find its way thru the machine and into the flask by way of the sand frame, when the reciprocable sand-receiving portion or housing 55 is in its lowermost position, with its lower edge resting upon the flask C, and the rotatable sand frame 57 in the position shown in Figure 3. Then the workman manipulates the controls described, and the sand frame is rotated a quarter turn counter-clockwise and the compacting face 59 comes into play, but sand is not lost, due to the operation of the pivoted guiding plates 62. The head 58 being imperforate, no sand can escape thru it. Reciprocation of the housing 55 will now cause compacting of the sand in the mold. Upon further manipulation of the controls, the leveling mechanism will be lowermost, due to rotation of the sand frame and the rotating discs will level the sand in the mold, as their lower faces assume the same position as that of the compacting face. By again manipulating the controls to bring the imperforate head lowermost, the bed plate 160 of the stripper D, carrying the pattern, may be lowered by the means 162 and permit removal of the mold and flask from the pattern.

Various changes in the shape, size and arrangement of parts may be made to the form of invention herein shown and described, without departing from the spirit of the invention or the scope of the following claims.

I claim:

1. A flask charging and molding machine for cooperation with a flask and pattern carrier, a stationary unit above said carrier including a hopper section, a measuring section, a distributing section and a spout for the sand; a vertically movable unit intermediate said stationary unit and carrier including a sleeve in telescopic relation with said spout; and a movable frame supported by said movable unit, carrying a sand frame, a tamping head and a leveling mechanism, any one of which may be disposed in operative relation to the flask.

2. A flask charging and molding machine for association with a flask and pattern carrier; a stationary unit above said carrier including a hopper section and a spout for the sand; a vertically movable unit intermediate said stationary unit and carrier including a sleeve in telescopic relation with said spout; and a movable frame supported by said movable unit, carrying a tamping head and a leveling mechanism, either of which may be disposed in operative relation to said flask.

3. A flask charging and molding machine for association with a flask and pattern carrier; a stationary unit above said carrier including a hopper section and a spout for the sand; a vertically movable unit intermediate said stationary unit and carrier including a sleeve in telescopic relation with said spout; and a rotatable frame supported by said movable unit, carrying a tamping head and a leveling mechanism, either of which may be disposed in operative relation to said flask.

4. A flask charging and molding machine for cooperation with a flask and pattern carrier, a stationary unit above said carrier including a hopper section, a measuring section, a distributing section and a spout for the sand; a vertically movable unit intermediate said stationary unit and carrier including a sleeve in telescopic relation with said spout; and a movable frame supported by said movable unit, carrying a sand frame, a tamping head and a leveling mechanism, any one of which may be disposed in operative relation to the flask, said sand frame having oppositely-disposed openings and a sand way communicating with said openings, said tamping head providing a side wall of said sand frame.

5. A flask charging and molding machine for cooperation with a flask and pattern carrier, a stationary unit above said carrier including a hopper section, a measuring section, a distributing section and a spout for the sand; a vertically movable unit intermediate said stationary unit and carrier including a sleeve in telescopic relation with said spout; and a movable frame supported by said movable unit, carrying a sand frame, a tamping head and a leveling mechanism, any one of which may be disposed in operative relation to the flask, said sand frame having oppositely-disposed openings and a sand way communicating with said openings and said leveling mechanism having a wall support, said tamping head providing one side wall of said sand frame and said wall support providing the wall of said sand frame opposite said tamping head.

6. A flask charging and molding machine for association with a flask and pattern carrier; a stationary unit above said carrier including a hopper section and a spout for the sand; a vertically movable unit intermediate said stationary unit and carrier including a sleeve in telescopic relation with said spout; and a movable frame supported by said movable unit, carrying a tamping head and a leveling mechanism, either of which may be disposed in operative relation to said flask, said leveling mechanism including a perforated disc and means for rotating said disc.

7. A flask charging and molding machine for association with a flask and pattern carrier; a stationary unit above said carrier including a hopper section and a spout for the sand; a vertically movable unit intermediate said stationary unit and carrier including a sleeve in telescopic relation with said spout; and a rotatable frame supported by said movable unit, carrying a tamping head and a leveling mechanism, either of which may be disposed in operative relation to said flask, said leveling mechanism including a perforated disc and means for rotating said disc with its axis of rotation normal to the axis of rotation of said frame.

8. A flask charging and molding machine for association with a flask and pattern carrier; a stationary unit above said carrier including a hopper section and a spout for the sand; a vertically movable unit intermediate said stationary unit and carrier including a sleeve in telescopic relation with said spout; and a rotatable frame supported by said movable unit, carrying a tamping head and a leveling mechanism, either of which may be disposed in operative relation to said flask, said leveling mechanism including a perforated disc and means for rotating said disc with its axis of rotation normal to the axis of rotation of said frame, said disc lying in a plane substantially the same distance from the axis of rotation of said frame as the compacting face of said tamping head is located.

9. A flask charging and molding machine for association with a flask and pattern carrier; a stationary unit above said carrier including a hopper section and a spout for the sand; a vertically movable unit intermediate said stationary unit and carrier including a sleeve in telescopic relation with said spout; and a rotatable frame supported by said movable unit, carrying a tamping head and a leveling mechanism, either of which may be disposed in operative relation to said flask, said leveling mechanism including a perforated disc and means for rotating said disc with its axis of rotation normal to the axis of rotation of said frame, said disc lying in a plane substantially the same distance from the axis of rotation of said frame as the compacting face of said tamping head is located, said sand frame having openings at two opposite sides and providing a sand way communicating with said openings, said tamping head providing one wall of said way.

10. In a foundry plant flask charging and molding machine, wherein the flask is disposed directly below said machine, a reciprocable sand-receiving, tamping and leveling unit, having a sand-receiving housing, a rotatable sand frame including a side wall providing a ramming head when in one position, a side wall opposite said first-named side wall, and end walls joining said side walls, said frame being open at its sides between said side walls and providing a sand way therethru when said sand frame is in a second position, sand leveling means for leveling sand in said mold, when said sand frame is in a third position, including a leveling mechanism, said leveling mechanism being supported by said second-named side wall, and means for rotating said sand frame to bring it into any one of said positions.

11. In a foundry plant flask charging and molding machine for association with a flask and pattern carrier and a sand conveyor, including a housing above said carrier and below said conveyor, having a hopper section, a spout therebelow for the sand and a combined sand discharge, tamping and leveling section, said hopper section having a sand inlet from said conveyor; means for measuring a volume of sand, within said hopper section; means for distributing said sand, disposed below said first-named means and above said spout; a sand frame in said combined section, carrying a sand-tamping head and a leveling mechanism; means for rotating said frame; means for reciprocating said head; and means for operating said leveling mechanism.

12. A flask charging and molding machine for association with a flask and pattern carrier; a stationary unit above said carrier including a hopper section and a spout for the sand; a vertically movable unit intermediate said stationary unit and carrier including a sleeve in telescopic relation with said spout; and a movable frame supported by said movable unit, carrying a tamping head and a leveling mechanism, either of which may be disposed in operative relation to said flask, the lower edge of said movable frame being adapted to contact the upper face of said flask, said leveling mechanism including a plurality of horizontally-disposed, rotating, perforated discs, with their lower faces in substantially the same plane and also in the same plane as said lower edge.

EDWARD H. WHITTAKER.